(12) United States Patent
Jarmon

(10) Patent No.: US 7,832,972 B2
(45) Date of Patent: Nov. 16, 2010

(54) INTERNAL POCKET FASTENER SYSTEM FOR CERAMIC MATRIX COMPOSITES

(75) Inventor: David C. Jarmon, Kensington, CT (US)

(73) Assignee: United Technologies Corporation, Hartford, CT (US)

(*) Notice: Subject to any disclaimer, the term of this patent is extended or adjusted under 35 U.S.C. 154(b) by 133 days.

(21) Appl. No.: 12/042,750

(22) Filed: Mar. 5, 2008

(65) Prior Publication Data

US 2009/0226279 A1  Sep. 10, 2009

(51) Int. Cl.
*F16B 21/00* (2006.01)

(52) U.S. Cl. .................. 411/553; 403/381; 403/409

(58) Field of Classification Search .............. 403/381, 403/25, 167, 168, 179, 194, 267, 199, 388; 411/90, 92, 553, 533, 357, 549, 382, 400, 411/409; 416/216.1
See application file for complete search history.

(56) References Cited

U.S. PATENT DOCUMENTS

| 5,222,852 | A | * | 6/1993 | Snyder | 411/553 |
|---|---|---|---|---|---|
| 5,242,241 | A | * | 9/1993 | Nelson | 403/396 |
| 5,429,581 | A | * | 7/1995 | Michaud et al. | 494/54 |
| 5,497,616 | A | * | 3/1996 | Roberts | 60/765 |
| 5,592,814 | A | * | 1/1997 | Palusis et al. | 60/770 |
| 6,042,315 | A | | 3/2000 | Miller et al. | |
| 6,045,310 | A | * | 4/2000 | Miller et al. | 411/383 |
| 6,128,876 | A | * | 10/2000 | Nitschke et al. | 52/239 |
| 6,186,691 | B1 | * | 2/2001 | Rudolf-Bauer | 403/31 |
| 6,220,969 | B1 | * | 4/2001 | Lilley | 464/173 |
| 6,311,447 | B1 | * | 11/2001 | Lindal | 52/590.2 |
| 6,627,019 | B2 | | 9/2003 | Jarmon et al. | |
| 6,718,774 | B2 | * | 4/2004 | Razzell | 60/798 |
| 6,773,215 | B2 | * | 8/2004 | Cuva et al. | 411/553 |
| 6,811,861 | B2 | | 11/2004 | Bank et al. | |
| 6,830,437 | B2 | | 12/2004 | Cairo et al. | |
| 6,895,761 | B2 | | 5/2005 | Mitchell et al. | |
| 6,904,395 | B1 | | 6/2005 | DeJack et al. | |
| 6,907,920 | B2 | * | 6/2005 | Warburton et al. | 165/168 |
| 6,918,306 | B1 | | 7/2005 | Cavallaro et al. | |
| 7,017,334 | B2 | | 3/2006 | Mayer et al. | |
| 7,044,709 | B2 | * | 5/2006 | Bruce et al. | 415/173.1 |
| 7,090,159 | B2 | * | 8/2006 | Condon et al. | 241/275 |
| 7,134,805 | B2 | * | 11/2006 | Yee | 404/50 |
| 7,197,852 | B2 | * | 4/2007 | Grillos | 52/144 |
| 7,563,071 | B2 | * | 7/2009 | Campbell et al. | 415/173.1 |
| 7,581,301 | B2 | * | 9/2009 | Arbona et al. | 29/525.02 |
| 2007/0220735 | A1 | * | 9/2007 | Arbona et al. | 29/525.01 |
| 2009/0324393 | A1 | * | 12/2009 | Gonzalez et al. | 415/170.1 |

FOREIGN PATENT DOCUMENTS

EP  1746257  1/2007

\* cited by examiner

*Primary Examiner*—Gary Estremsky
(74) *Attorney, Agent, or Firm*—Carlson Gaskey & Olds PC

(57) ABSTRACT

A fastener system provides an internal pocket within a CMC component into which a fastener is inserted through an internal pocket opening and loaded to secure the CMC structure to a support structure.

17 Claims, 4 Drawing Sheets

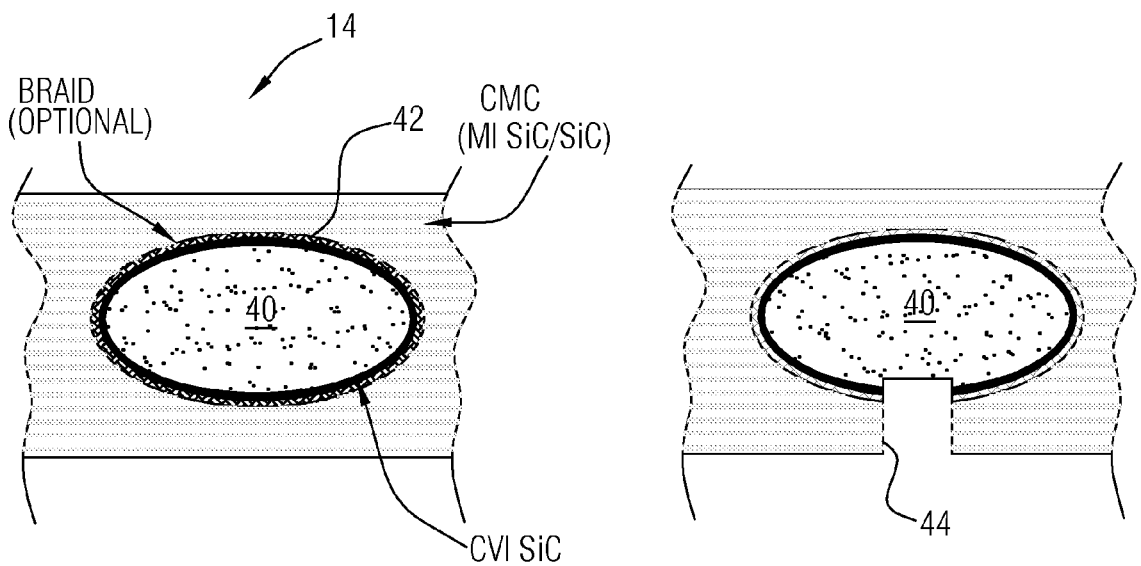
FIG. 4A
FIG. 4B
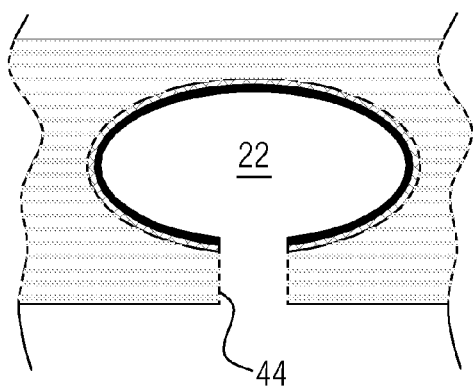
FIG. 4C

INTERNAL POCKET FASTENER SYSTEM FOR CERAMIC MATRIX COMPOSITES

BACKGROUND OF THE INVENTION

The present invention relates to a fastener system, and more particularly to a fastener system which secures a composite panel to a noncomposite support structure.

Aerospace/industrial gas turbine engine (GTE) applications and hypersonic propulsion systems include several component assemblies which are exposed to high temperatures. Among these component assemblies are combustion chambers, exhaust nozzles, afterburner liners and heat exchangers. These component assemblies may bound a portion of a gas path that directs the combustion gases through the engine and are often constructed of heat tolerant materials. Ceramic matrix composites (CMCs) are one class of materials which possess the requisite heat tolerance properties for these applications. CMCs typically include materials of carbon or silicon carbide fibers in a carbon or silicon carbide matrix.

Although CMC components provide significant heat tolerance properties, the CMC materials alone may not withstand the severe mechanical and structural demands of these applications. Often, a noncomposite support structure is utilized with the heat tolerant CMC structures to form the component assemblies. The CMC structure heat shields the noncomposite support structure to maintain the noncomposite support structure within operational temperature limits.

The CMC structure is commonly secured to the noncomposite support structure with mechanical metal or composite fasteners, CMC "T" joints, Miller fasteners and round braided fasteners. Although effective, each current fastener system may result in specific design constraints which need be accommodated by the component assembly. Current fastener systems may also have to contend with leakage around the fastener and tolerance control issues. Furthermore, fastener systems for certain applications may require that the fastener system be flush as any portion that may otherwise project into a combustion gas path may introduce undesirable turbulence and be subject to foreign object damage.

SUMMARY OF THE INVENTION

A fastener system according to an exemplary aspect of the present invention secures a CMC structure to a noncomposite support structure. A fastener head of a fastener stud is inserted through an internal pocket opening and rotated within an internal pocket such that the fastener is locked into the internal pocket formed within the CMC structure. A fastener shank of the fastener stud is attached to the noncomposite support structure with foot hardware and loaded to secure the CMC structure to the noncomposite support structure to complete component assembly.

A method to form the internal pocket within the CMC structure according to an exemplary aspect of the present invention is initiated by locating a carbon insert into or between the CMC component fiber preform during the weaving process. Standard CMC consolidation processes consolidate the fiber preform containing the carbon insert. At least one slot is machined through the CMC structure and into the carbon insert to define the internal pocket opening. The carbon insert is then thermally decomposed after CMC component consolidation to thereby form the internal pocket within the CMC structure.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows:

FIG. 4A is an expanded sectional view of a carbon insert located within a CMC structure;

FIG. 4B is a sectional view of the carbon insert of FIG. 4A having a internal pocket opening machined therein; and FIG. 4C is a sectional view of the CMC structure after the carbon insert has been burned out thereby forming the internal pocket for receipt of a fastener stud.

DETAILED DESCRIPTION OF THE DISCLOSED EMBODIMENT

Figure 1A:
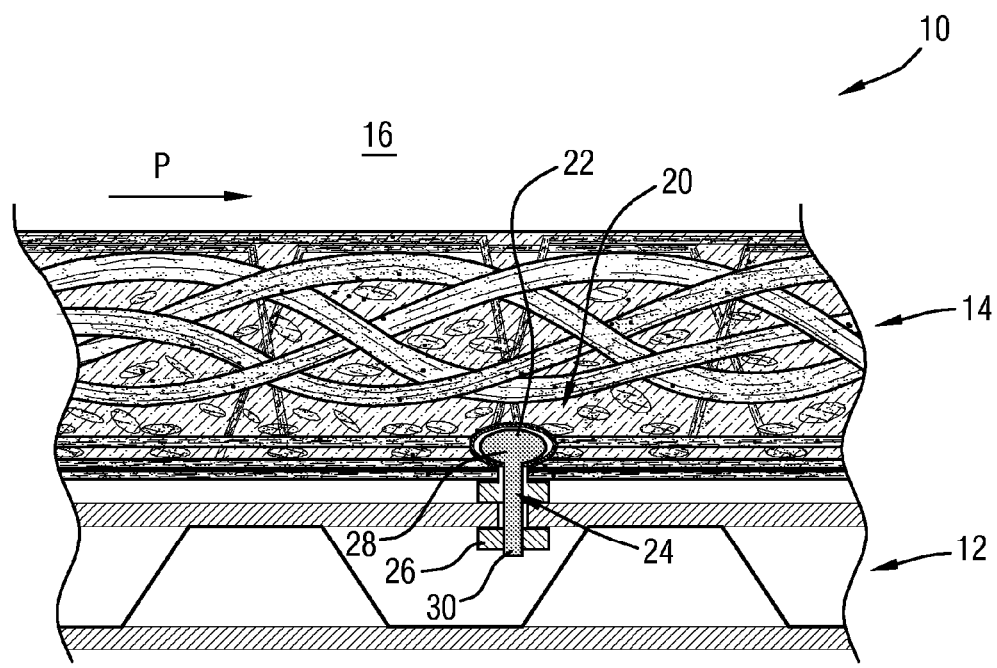
FIG. 1A is a schematic sectional view illustrating a fastener system for attachment of a ceramic matrix composite structure to a noncomposite support structure.

FIG. 1A schematically illustrates a heat tolerant component assembly 10 which may, for example, be exposed to hot gaseous combustion products P inclusive of, but not limited to, combustion chambers, exhaust nozzles, afterburner liners and heat exchangers. The gaseous combustion products P flow through a gas path 16 bounded, at least in part, by the component assembly 10. It should be understood that although a particular component assembly arrangement is disclosed in the illustrated embodiment, other arrangements, including those which may not bound a gas path, will also benefit from the instant invention.

The component assembly 10 includes a noncomposite support structure 12 and a heat tolerant ceramic matrix composite (CMC) structure 14 such as silicon carbide fibers in a silicon carbide matrix (SiC/SiC); silicon carbide fibers in a silicon-nitrogen-carbon matrix (SiC/SiNC); and melt-infiltrated silicon-carbide-fiber-reinforced silicon carbide (MI SiC/SiC) composite panels. The CMC component 14 may be manufactured from a woven preform with a 3-dimensional (3-D) weave so as to provide high interlaminar mechanical properties. The noncomposite support structure 12 operates as a structural frame while the heat tolerant CMC structure 14 shields the support structure 12 from the intense heat of the combustion products P to maintain the support structure within operational temperature limits.

Figure 1B:
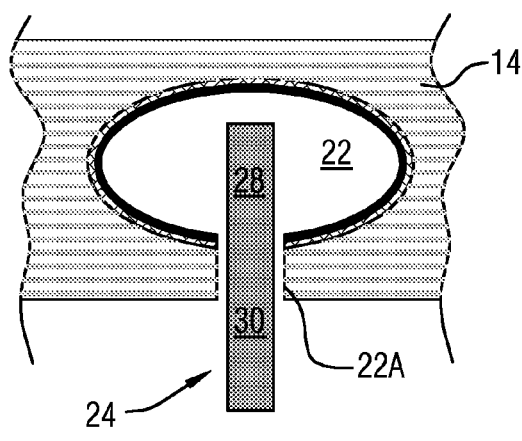
FIG. 1B is a schematic view of a fastener stud in a disengaged position.

A fastener system 20 secures the CMC structure 14 to the noncomposite support structure 12. The fastener system 20 generally includes an internal pocket 22 formed within the CMC structure 14, a fastener stud 24 and foot hardware 26. The internal pocket 22 may be an ellipsoid volume while the pocket opening 22A may be a rectilinear volume formed within the CMC structure 14. The fastener stud 24 includes a head 28 and a shank 30 which extends from the head 28. The head 28 and the shank 30 are of a generally equivalent thickness (FIG. 1B). The fastener stud 24 may be manufactured of metal or CMC. If CMC, the fiber architecture of the fastener can be controlled independent of the component fiber architecture. The foot hardware 26 may include a threaded nut, a spring, a collar developed for Miller fasteners, or other such attachment hardware.

Figure 1C:
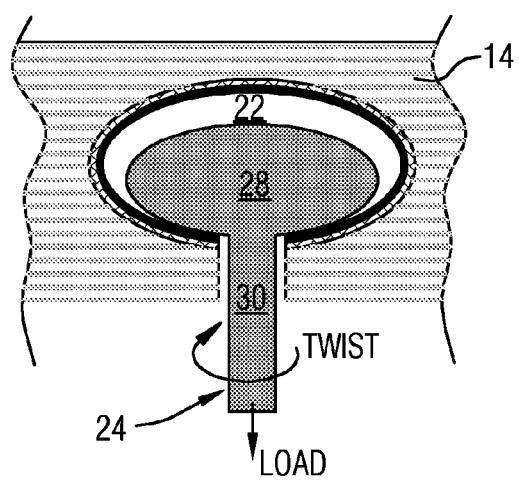
FIG. 1C is a schematic view of a fastener stud in an engaged position.

The fastener stud 24 is inserted into the internal pocket 22 such that the head 28 fits through the pocket opening 22A (FIG. 1B) then rotated and loaded (FIG. 1C) by the foot hardware 26 so as to secure the CMC structure 14 to the noncomposite support structure 12. The fastener system 20 provides interlaminar properties, minimizes gas leakage, minimizes tolerance issues and does not even project through the CMC structure 14 which thereby assures operation in a flush configuration.

Figure 2:
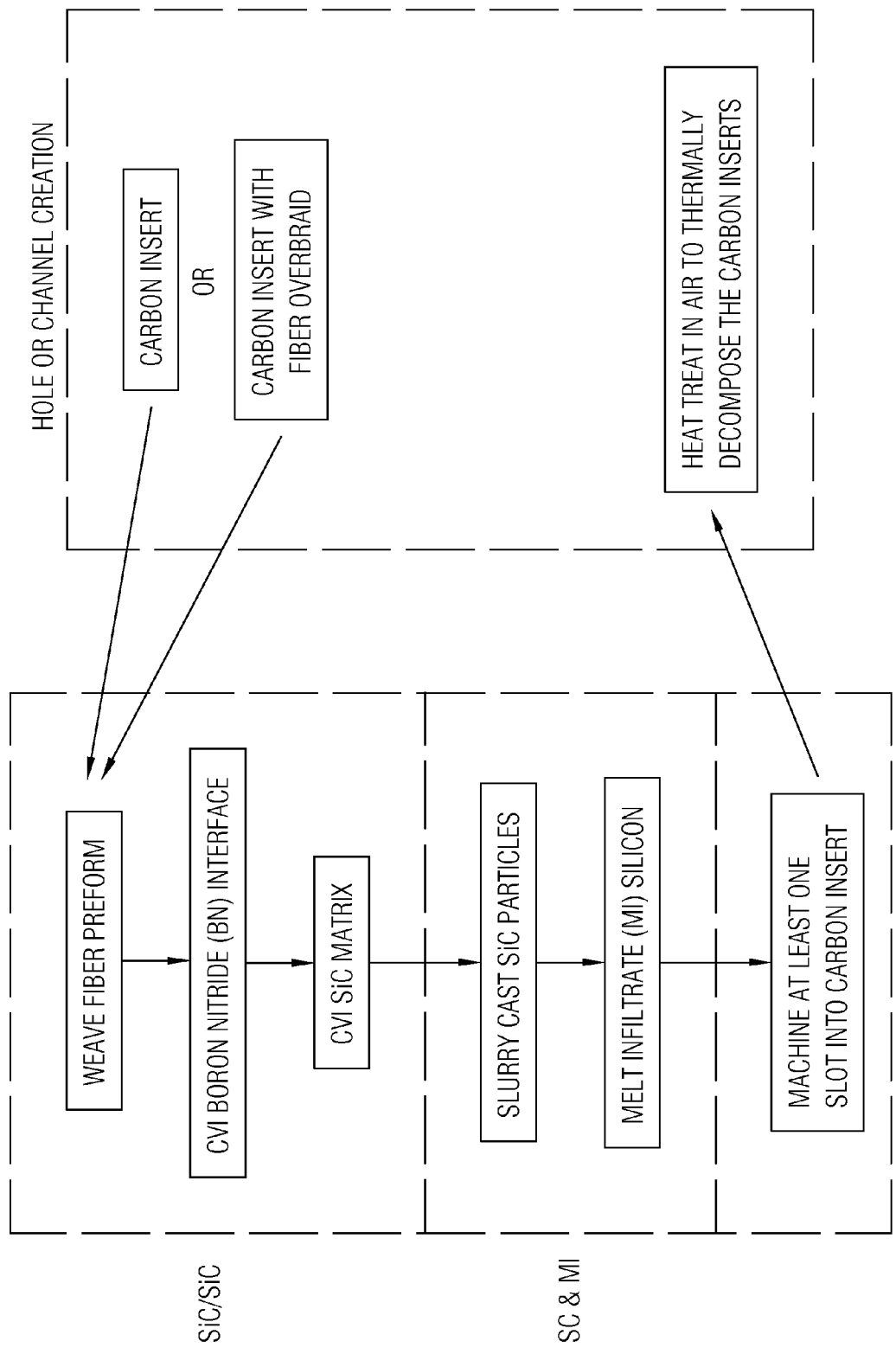
FIG. 2 is a block diagram flowchart which illustrates a method to manufacture the internal pocket in a CMC structure.
Figure 3A:
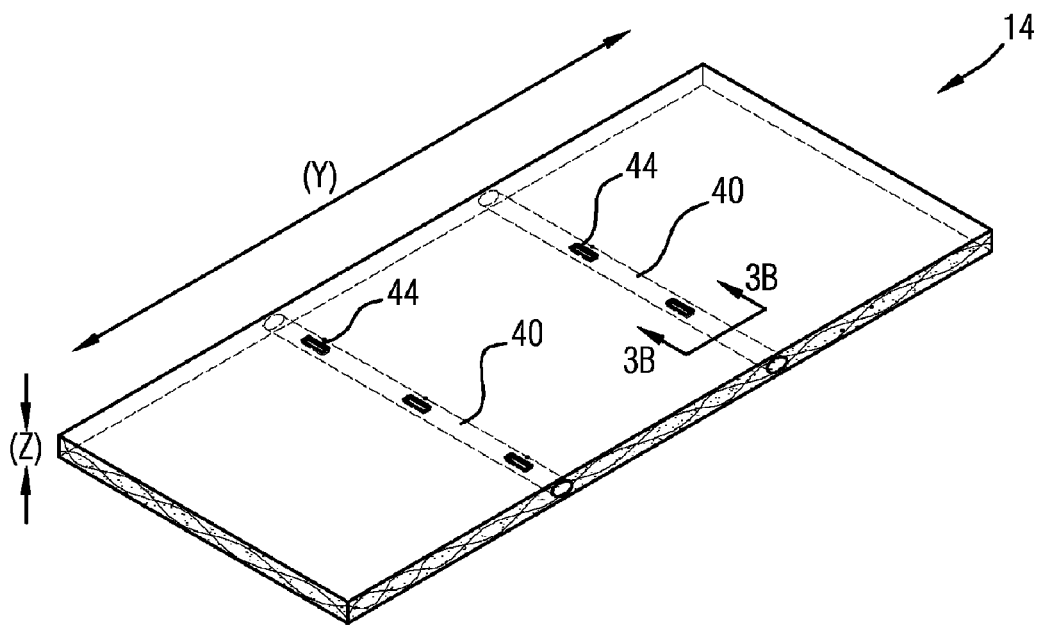
FIG. 3A is a perspective partial phantom view of a CMC structure illustrating internal pocket channels formed therein.

Referring to FIG. 2, a method to manufacture the internal pocket 22 is illustrated in a block diagram flowchart form. The CMC structure 14 is first fabricated with one or more carbon inserts 40 during the weaving process (FIG. 3A). The length of the carbon insert 40 is sized to receive one or a multiple of studs 24. That is, a single carbon insert 40 may receive a multiple of machined slots 42 which each form a pocket opening 22A such that a single carbon insert 40 may receive a multiple of studs 24 (FIG. 3A).

Figure 3B:
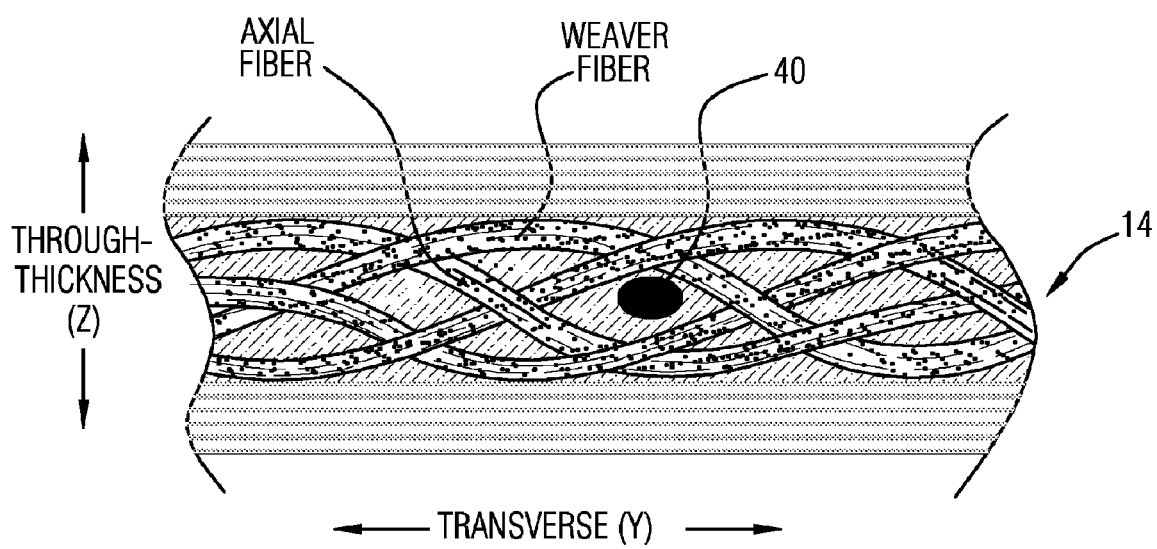
FIG. 3B is a sectional view of the CMC structure taken along line 3B-3B in FIG. 3A laterally to the internal pocket channel.

The carbon insert 40 may be a graphite/epoxy rod manufactured, for example, by Avia Sport of Hickory, N.C. USA. Rods of this type may be made by pultrusion ("pultruded") and are commercially available, although conventionally used for applications such as tent poles. Pultruded graphite/epoxy rods (having continuous graphite filaments) are commercially available in a variety of diameters and a variety of cross-sectional shapes, so channels of different cross sectional shapes may be readily formed. The carbon insert 40, although illustrated as an oval shape cross-section in the disclosed embodiment, may be of any cross-sectional shape such as racetrack, rectilinear, circular, trapezoidal, complex or other such cross-sectional shape. The carbon inserts 40 may be inserted by hand into or between plies of woven ceramic fibers; or they may be inserted in the fill direction into either a two or three-dimensional preform during the weaving process. (FIG. 3B) Voids or channels of various shapes are created within the CMC component 14 by the carbon insert 40 (with or without the overbraid 42) which are incorporated into or between the fiber plies as they are being laid-up in the mold during formation of the CMC component 14 during the weaving process.

The carbon inserts 40 include a plurality of carbon fibers surrounded by a carbonaceous filler. As used herein, a "carbonaceous" filler material is a material that produces at least about 10% carbon residue, by weight, upon thermal decomposition in a non-oxidizing environment. Without intending to limit the same, examples of carbonaceous filler materials usable in the process disclosed herein are colloidal graphite (with or without a binder) and polymers containing sufficient carbon molecules to satisfy the definition of "carbonaceous", such as epoxy, silicone, and polyacrylonitrile.

Each carbon insert 40 may additionally be further fiber-reinforced by an overbraided fiber braid layer 42 (FIG. 4A). The fiber braid layer 42 reinforces each carbon insert 40 to provide hoop reinforcement when consolidated into the CMC component 14. The fiber braid layer 42 may include a braiding Hi-Nicalon Type S fiber from Nippon Carbon Corp.

Standard CMC consolidation processes may be utilized to consolidate the fiber preform containing the carbon insert 40. After the carbon inserts are in place, a ceramic matrix material is added and the fiber preform is consolidated with the matrix material. During the consolidation step, the carbonaceous filler material that fills the interstices between the carbon fibers of the carbon inserts 40 and operates as a protective shell around individual carbon fibers and around any bundles of those fibers that define the carbon insert 40. This inhibits process gases and matrix material from entering voids between the carbon fibers and from directly contacting the carbon fibers. The matrix material, if able to contact the fibers, may inhibit the oxidation of the carbonaceous inserts by depositing a non-oxidizable coating on the fibers, making successful removal difficult. Any matrix material that works its way between the carbon fibers may not be removed during thermal decomposition. Thus, by way of example, in a chemical vapor infiltration (CVI) consolidation of a SiC/SiC composite, the carbonaceous filler inhibits the methyltrichlorosilane gas from contacting the carbon fibers and depositing silicon carbide thereon.

In the consolidation process for the CMC structure 14, the chemical vapor infiltration process (CVI) results in a SiC layer being formed around the carbon insert 40 (FIG. 4A). That is, when the internal pockets are formed within the CMC structure 14 by the thermal decomposition of the carbon insert 40, applicant has demonstrated that a SiC layer forms on the inner surface of the internal pocket 22.

Further densification of the matrix region may be accomplished by slurry casting an aqueous solution of SiC particles. The final densification of the composite may be completed by applying silicon to the surface of the panel and heating in a furnace—a process called melt infiltration (MI) of silicon.

At least one slot 44 is machined through the CMC structure 14 and into the cold surface carbon insert 40 to define the pocket opening 22A after consolidation of the preform and matrix material (FIG. 4B). Although the pocket opening 22A is illustrated as a 2-dimensional slot in the disclosed embodiment, it should be understood that the pocket opening 22A may be formed to any desired shape or geometry.

The carbon insert 40 is then thermally decomposed (FIG. 4C). The carbon insert 40 is burned out by thermally decomposing in an oxidizing atmosphere at elevated temperatures, such as greater than 800° F. The CMC component 14, such as MI SiC/SiC, is environmentally stable in an oxidizing combustion environment up to 2400 degrees F. With an environmental barrier coating (EBC) applied to the CMC component 14 surface, this temperature increases to 2700 degrees F. depending on the coating and mission. The EBC may be applied to the CMC hot surface without holes for fastener and gaps between fastener and holes because the internal pocket does not penetrate to the hot surface which bounds the gas path 16 (FIG. 1). This minimizes or prevents spalling of the EBC.

For further understanding of other aspects of the manufacture of such channels, attention is directed to U.S. Pat. No. 6,627,019, issued Sep. 30, 2003, "Process for Making Ceramic Matrix Composite Parts with Cooling Channels" which is assigned to the assignee of the instant invention and which is hereby incorporated herein in its entirety.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A fastener system comprising:
   a CMC component having an internal pocket formed therein, said internal pocket having a rectilinear pocket opening transverse to said internal pocket which extends through an outer surface of said CMC component, said internal pocket defines an ellipsoid volume.

2. The system as recited in claim 1, further comprising a fastener stud which defines a head and a shank which define a generally equivalent thickness, said head receivable within said internal pocket for rotation therein between an engaged and a disengaged position.

3. The system as recited in claim 2, wherein a geometric shape of said head corresponds with said internal pocket.

4. The system as recited in claim 3, wherein a lateral cross-section of said internal pocket corresponds to said head.

5. The system as recited in claim 2, wherein said stud receives a foot hardware assembly to mount said CMC component to a noncomposite support structure.

6. The system as recited in claim 1, wherein said pocket opening is defined in part by a rectilinear volume.

7. The system as recited in claim 1, wherein said internal pocket is formed completely within said CMC component, said pocket opening extends through one surface of said CMC component.

8. A fastener system comprising:
   a CMC component having an internal pocket formed therein, said internal pocket having a rectilinear pocket opening in communication with said internal pocket which extends through an outer surface of said CMC component, said internal pocket having at least one pocket opening, said internal pocket defines an ellipsoid volume with a silicon carbide (SiC) internal layer.

9. The system as recited in claim 8, wherein said pocket opening is defined in part by a rectilinear volume.

10. A fastener system comprising:
    a CMC component having an internal pocket formed therein, said internal pocket having a rectilinear pocket opening in communication with said internal pocket which extends through an outer surface of said CMC component, said internal pocket having at least one pocket opening, said internal pocket defines an ellipsoid volume surrounded by a fiber braid layer, said internal pocket opening extends through said fiber braid layer.

11. The system as recited in claim 10, wherein said pocket opening is defined in part by a rectilinear volume.

12. An assembly comprising:
    a CMC component having an internal pocket formed therein, said internal pocket having a pocket opening transverse to said internal pocket which extends through an outer surface of said CMC component, said internal pocket defines an ellipsoid volume;
    a noncomposite support structure; and
    a fastener system that secures said CMC component to said noncomposite support structure, said fastener system including a fastener stud which defines a head and a shank of a generally equivalent thickness, said head receivable within said internal pocket for rotation therein between an engaged and a disengaged position, said noncomposite support structure mounted to said fastener shank.

13. The assembly as recited in claim 12, wherein said fastener shank is mountable to said noncomposite support structure with removable foot hardware.

14. The assembly as recited in claim 13, wherein said at least one internal pocket includes a multiple of internal pockets.

15. The assembly as recited in claim 12, wherein a geometric shape of said head corresponds with said internal pocket.

16. The assembly as recited in claim 15, wherein said internal pocket opening is rectilinear.

17. The assembly as recited in claim 12, wherein said internal pocket defines a longitudinal internal pocket within said CMC component.

* * * * *